(12) United States Patent
Stengel

(10) Patent No.: US 7,169,875 B2
(45) Date of Patent: Jan. 30, 2007

(54) ORGANOMETALLIC COMPOSITIONS

(75) Inventor: Bruno Frederic Stengel, Stockton on Tees (GB)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 10/479,330

(22) PCT Filed: May 28, 2002

(86) PCT No.: PCT/GB02/02246

§ 371 (c)(1),
(2), (4) Date: Dec. 1, 2003

(87) PCT Pub. No.: WO02/096968

PCT Pub. Date: Dec. 5, 2002

(65) Prior Publication Data

US 2004/0147706 A1   Jul. 29, 2004

(30) Foreign Application Priority Data

May 29, 2001 (GB) .................................. 0112901.4

(51) Int. Cl.
*C08G 18/22* (2006.01)

(52) U.S. Cl. .................. 528/56; 502/161; 502/168; 502/170; 502/171; 502/172; 556/27; 556/40; 556/54; 556/55; 556/138; 556/182; 556/183

(58) Field of Classification Search .................. 528/56; 502/161, 168, 170–172; 556/27, 40, 54, 556/55, 138, 182, 183
See application file for complete search history.

(56) References Cited

U.S. PATENT DOCUMENTS

| 3,025,172 A | * | 3/1962 | Bernstein .................. 106/31.73 |
| 3,654,374 A |   | 4/1972 | Scheyer |
| 4,442,275 A | * | 4/1984 | Martin ......................... 526/96 |
| 4,794,129 A |   | 12/1988 | Gillis, Jr. et al. |
| 5,478,802 A | * | 12/1995 | Moradi-Araghi ............ 507/203 |
| 5,846,897 A |   | 12/1998 | Blank et al. |
| 5,849,864 A | * | 12/1998 | Carlson et al. ............... 528/55 |
| 5,902,835 A |   | 5/1999 | Meier et al. |
| 6,084,026 A |   | 7/2000 | Jamasbi |

FOREIGN PATENT DOCUMENTS

| DE | 39 38 203 A1 |   | 5/1991 |
| GB | 2 303 372 A |   | 2/1997 |
| SU | 1634673 | * | 3/1991 |
| WO | WO-97/17388 |   | 5/1997 |
| WO | WO-98/41322 |   | 9/1998 |
| WO | WO-00/02855 |   | 1/2000 |

OTHER PUBLICATIONS

Di Serio et al; Ethoxylation of fatty alcohols promoted by an aluminum alkoxide sufate catalyst; Journal of Metal Catalysis; 112 (2); 1996; pp. 235-251; abstract.*
International Search Report dated Aug. 29, 2002, from International Application No. PCT/GB02/02246.

* cited by examiner

*Primary Examiner*—Rachel Gorr
(74) *Attorney, Agent, or Firm*—RatnerPrestia

(57) ABSTRACT

A composition suitable for use as a catalyst for the reaction of an isocyanate compound or prepolymer thereof with an alcohol to form a polyurethane comprises a mixture of (a) an organometallic compound selected from: (i) a compound of formula $M(RO)_4$, where M is titanium, zirconium, hafnium, aluminium, cobalt or iron or a mixture of these metals and OR is the residue of an alcohol ROH in which R comprises an (optionally substituted) $C_{1-30}$ cyclic, branched or linear, alkyl, alkenyl, aryl or alkyl-aryl group or a mixture thereof, or; (ii) a complex of titanium, zirconium and/or hafnium and an acetoacetate ester and (b) a coordinating compound selected from a ketone, aldhehyde, carboxylic acid, sulphonic acid, nitride or an imine. An isocyanate composition containing a catalyst of the claimed composition is also described.

22 Claims, 1 Drawing Sheet

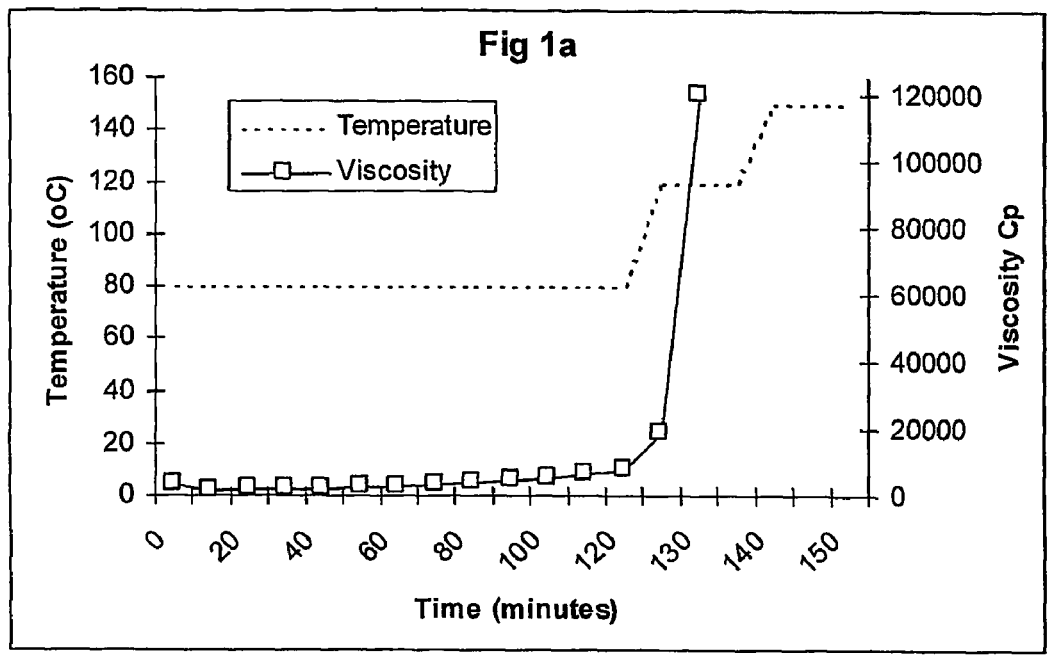
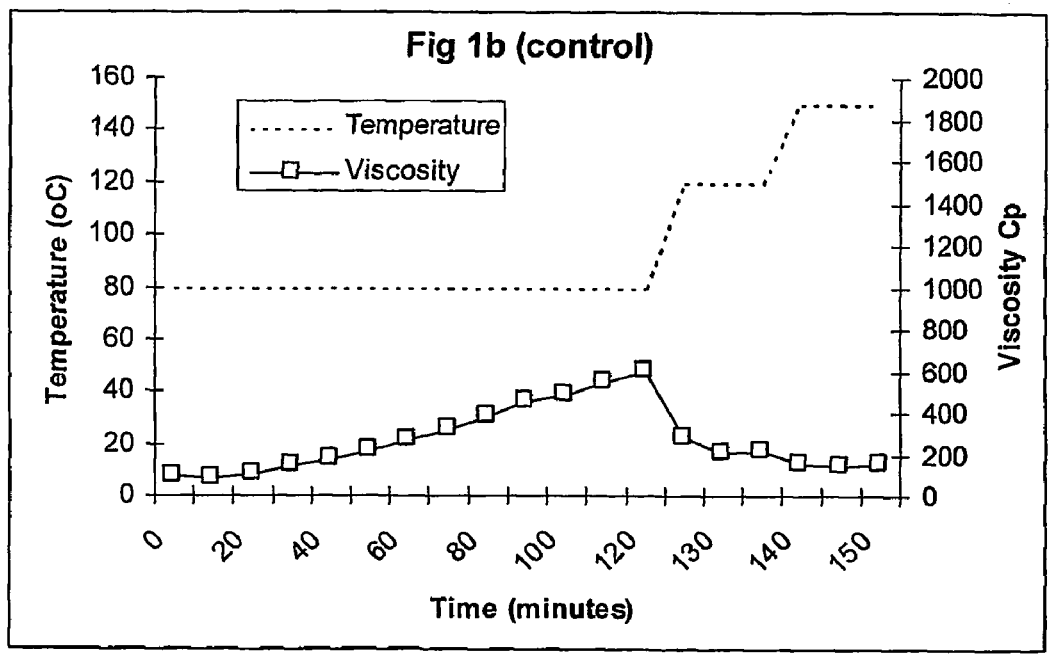

ORGANOMETALLIC COMPOSITIONS

This application is the U.S. National Phase application of PCT International Application No. PCT/GB02/02246.

This invention relates to organometallic compositions which are useful in catalysing the reaction between a polyisocyanate and a composition reactive therewith, such as a polyol, to form polyurethane or like compositions.

The reaction between isocyanates and polyisocyanates with a polyol or other hydroxyl-bearing component is used in many applications in which it is necessary to effect curing of polyurethane compositions, e.g. in polyurethane coatings, adhesives, mouldings, sealants, rigid or flexible foam manufacture, elastomers or when organic polyisocyanates are used as binders for lignocellulosic material in the manufacture of sheets or moulded bodies such as waferboard, chipboard, fibreboard and plywood etc.

Catalysts for polyurethane manufacture are conventionally based on tin compounds such as dibutyl tin dilaurate or compositions of mercury such as phenyl mercuric neodecanoate. More recently, compounds based upon metals such as titanium or nickel have been used.

A polyisocyanate composition is disclosed in PCT Application WO 97/17388 which comprises a Group IVB metal compound, preferably a titanium chelate, optionally in combination with a compatibilising compound and/or conventional release agents. Although these compositions perform well as binders for lignocellulosic material and provide good release performance, it is desirable to develop a more economical composition which provides improved stability on storage before use, together with good curing properties and excellent bonding strength when applied to the lignocellulosic material.

U.S. Pat. No. 5,846,897 discloses zirconium compounds with diketones or alkylacetoacetates which catalyse the isocyanate—alcohol reaction having the chemical structure: Me (X1, X2, X3, X4) wherein Me is zirconium (Zr) or hafnium (Hf) and X1, X2, X3, and X4, are the same or different and selected from the group consisting of a diketone and an alkylacetoacetate having the structures: $R_1COCH_2COR_2$ and $R_1OCOCH_2COR_2$ wherein each of $R_1$ and $R_2$ is a branched or linear C1–C20 hydrocarbon and at least one of X1, X2, X3, and X4 is a diketone with structure (II) wherein the total number of carbons in $R_1+R_2$ is at least 4.

International Patent Application WO 00/02855 discloses that certain compounds of Group IVB metals can be used to cure isocyanate and polyisocyanate compositions and these compositions are very stable on prolonged storage and economical when used for binding lignocellulosic material. The compounds disclosed are complexes of titanium, zirconium and/or hafnium and a acetoacetate ester in which the molar ratio of Ti or Hf to acetoacetate ester is in the range 1:2.5 to 1:10 or the molar ratio of Zr to acetoacetate ester is in the range 1:4.5 to 1:10 and said acetoacetate ester is an ester of an alcohol containing 1 to 6 carbon atoms.

It is desirable to be able to control the rate of the reaction of the isocyanate in order to improve the properties of the resulting polyurethane. It may also be desirable to retard the reaction in order that curing may be effected at a precise time, for example to enable the isocyanate composition or a prepolymer to be thoroughly mixed and applied, e.g. to a mould or a surface before the curing reaction begins. The time between mixing the isocyanate composition and other components of the polymer system and the increase in viscosity which tends to inhibit mixing and pouring etc is commonly referred to as the "cream time" of the mixture. It is beneficial to provide a polyisocyanate system which has a cream time which is long enough to allow for sufficient handling and manipulation of the mixed polymer precursor but which polymerises rapidly when required. It is also beneficial to provide a polyisocyanate system which may be rapidly polymerised when certain conditions, for example a particular temperature, is applied.

Furthermore it is desirable to be able to mix the catalyst system into one of the components (i.e. polyisocyanate or polyol) used to form the polyurethane system and then to be able to store the mixture for a period of up to several weeks without significant change in the curing characteristics of the mixture, i.e. to provide a curable component of a polyurethane system which has an acceptable shelf-life.

GB-A-2303372 discloses a process for manufacturing polyurethanes, especially foams, using a catalyst system comprising at least one metal acetyl acetonate and acetyl acetone. The acetyl acetone provides a delay mechanism by inhibiting the catalytic activity of the metal acetyl acetonate until the acetyl acetone is driven off by heating the mixture to above the boiling point of the acetyl acetone.

It is an object of the present invention to provide an improved organometallic composition which is useful in the curing of polyisocyanate compositions.

FIG. 1a is a graph showing change is viscosity over time for a polyisocyanate composition comprising a catalyst composition according to the invention.

FIG. 1b is a graph showing change is viscosity over time for a prior art polyisocyanate composition in the absence of the instant catalyst composition, as a control run for the composition used in FIG. 1a.

According to the invention, a composition suitable for use as a catalyst for the reaction of an isocyanate compound or prepolymer thereof with an alcohol or polyol to form a polyurethane comprises a mixture of (a) an organometallic compound selected from
   (i) an alkoxide compound of formula $M(OR)_x$, where M is titanium, zirconium, hafnium aluminium, cobalt or iron or a mixture of these metals, where x is the valency of the metal, and OR is the residue of an alcohol ROH in which R comprises an (optionally substituted) $C_{1-30}$ cyclic, branched or linear, alkyl, alkenyl, aryl or alkyl-aryl group or a mixture thereof, or
   (ii) a complex of titanium, zirconium and/or hafnium and an acetoacetate ester and
(b) a coordinating compound selected from a ketone, aldehyde, carboxylic acid, sulphonic acid, nitrile or an imine, wherein said coordinating compound does not comprise a diketone or an acetoacetate ester.

In a further aspect of the invention we provide a curable composition for the manufacture of a polyurethane material said composition comprising.

A. a polyol component and
B. a polyisocyanate component and
C. a catalyst composition comprising a mixture of:
   (a) an organometallic compound selected from
      (i) an alkoxide compound of formula $M(OR)_x$, where M is titanium, zirconium, hafnium aluminium, cobalt or iron or a mixture of these metals, where x is the valency of the metal, and OR is the residue of an alcohol ROH in which R comprises an (optionally substituted) $C_{1-30}$ cyclic, branched or linear, alkyl, alkenyl, aryl or alkyl-aryl group or a mixture thereof, or
      (ii) a complex of titanium, zirconium and/or hafnium and, an acetoacetate ester and (b) a coordinating compound selected from a ketone, aldehyde, carboxylic acid, sulphonic acid, nitrile or an imine, wherein said coordinating compound does not comprise a diketone or an acetoacetate ester.

In a further aspect of the invention we provide a process for the manufacture of a polyurethane composition, comprising the step of mixing together a a polyol component and a polyisocyanate component and a catalyst composition, said catalyst composition comprising a mixture of:

((a) an organometallic compound selected from
  (i) an alkoxide compound of formula $M(OR)_x$, where M is titanium, zirconium, hafnium aluminium, cobalt or iron or a mixture of these metals, where x is the valency of the metal, and OR is the residue of an alcohol ROH in which R comprises an (optionally substituted) $C_{1-30}$ cyclic, branched or linear, alkyl, alkenyl, aryl or alkyl-aryl group or a mixture thereof, or
  (ii) a complex of titanium, zirconium and/or hafnium and an acetoacetate ester and
(b) a coordinating compound selected from a ketone, aldehyde, carboxylic acid, sulphonic acid, nitrile or an imine, wherein said coordinating compound does not comprise a diketone or an acetoacetate ester.

The catalyst composition may be mixed with either the polyol or the-polyisocyanate components or added to a mixture of the said components or to a prepolymer having both polyol and isocyanate functionality.

The mixture may be held at an elevated temperature in order to effect curing. It is a particular benefit of the present catalyst and process that the polymerisation reaction may be delayed at lower temperatures and initiated at higher temperatures so that the polymerisation may be controlled by controlling the temperature of the reaction medium. For example, the polymerisation may take place at from room temperature to 200° C., more preferably at temperatures up to about 150° C. The temperature used depends upon the catalyst and the nature of the polyurethane reaction mixture used. It is particularly beneficial to provide such a catalyst so that the polyurethane reaction mixture is flowable and may be manipulated at low temperatures and then caused to cure by raising the temperature. Such a system enables e.g. an adhesive made from the polyurethane mixture to be repositioned at low temperatures or for a polyurethane mixture to be filled into a mould before the mixture begins to polymerise.

The catalyst may be added neat or in a solvent such as toluene for example.

M is selected from the group consisting titanium, zirconium, hafnium, aluminium, cobalt or iron or a mixture of these metals but in a preferred form M is Ti, Al or Zr, especially Ti.

The group RO is an alkoxide group in which R is a substituted or unsubstituted, $C_{1-30}$ cyclic, branched or linear, alkyl, alkenyl, aryl or alkyl-aryl group or a mixture thereof In some applications, R preferably contains up to 6 carbon atoms and, more preferably, up to 4 carbon atoms. Generally, all four OR groups will be identical but alkoxides derived from a mixture of alcohols can be used and mixtures of alkoxides can be employed when more than one metal is present in the complex. In suitable compositions, R is ethyl, iso-propyl, n-propyl, t-butyl or n-butyl, 2-ethyl hexyl or other branched octyl species such as iso-octyl. (2,4,4 trimethyl 1 pentanol) or mixed isomers of branched alkyl alcohol species such as the "Exxal™" products, e.g. Exxal 8, available from Exxon. Other alcohols are also suitable for forming the alkoxide.

Suitable alkoxides include tetramethoxytitanium, tetraethoxytitanium, tetra-isopropoxytanium, tetra-n-propoxytitanium, tetrabutoxytitanium, tetrapropoxyzirconium, tetrabutoxyzirconium, tetra-n-propoxyhafnium and tetra-n-butoxyhafnium. Alkoxides of higher alcohols may be prepared by transesterification of a lower alkoxide as is known in the art.

The coordinating compound is selected from a ketone, an aldehyde (such as an alkyl or aryl aldehyde), a carboxylic acid (such as aliphatic carboxylic acids e.g. stearic acid), a sulphonic acid (an alkyl or aryl sulphonic acid which is preferably substituted, e.g. 4-dodecylbenzenesulphonic acid or p-toluene sulphonic acid), a nitrile (e.g. valeronitrile or acetonitrile) or an imine (such as for example the reaction product of an alkyl or aryl aldehyde with aniline). The coordinating compound preferably does not comprise a diketone or an acetoacetate ester.

Preferred compounds include ketones, for example alkyl ketones, especially simple mono-ketones such as methyl ethyl ketone or aromatic ketones. We have found that certain properties such as shelf-life may be enhanced if the keto-enol tautomerisation equilibrium of the ketone favours the ketone form under the conditions used to make and store the compositions, i.e. there is a very significant excess of the keto form. To this end, certain ketones in which the enol form is made only slowly or with difficulty may be preferred in certain circumstances. Such ketones include those where the C atom which is adjacent the carbonyl group (the α-C atom) is substituted as in 2,4 dimethyl petan-3one, for example. The substituent may be an alkyl or aryl group.

The molar ratio of organometallic compound to coordinating compound in the composition is preferably in the range 1:0.5 (more preferably 1:1) to 1:10. When the metal is titanium, the molar ratio is preferably in the range 1:0.5 to 1:4 and more preferably in the range 1:1 to 1:3, especially about 1:2.5. When the metal is hafnium or zirconium, the molar ratio is preferably 1:4 to 1:10 and more preferably 1:4 to 1:8, hafnium or zirconium to total coordinating compound.

The compositions may be made by mixing together the organometallic compound and the coordinating compound until a homogeneous mixture is formed. Preferably the mixing is carried out under an inert atmosphere such as nitrogen because the compositions may be moisture sensitive.

The catalyst compositions of the invention are particularly useful as curing agents in polyurethane systems. Polyurethane systems typically comprise a polyisocyanate component and a polyol component or a prepolymer which comprises the polyol and isocyanate components. The polyurethane system may comprise more than one type of polyol or polyisocyanate compound.

The isocyanate compositions suitable for use with the catalysts of the present invention may be any organic polyisocyanate compound or mixture of organic polyisocyanate compounds, provided said compounds have at least 2 isocyanate groups. Organic polyisocyanates include diisocyanates, particularly aromatic diisocyanates, and isocyanates of higher functionality.

Examples of organic polyisocyanates include aliphatic isocyanates such as hexamethylene diisocyanate and isophorone diisocyanate; and aromatic isocyanates such as m- and p-phenylene diisocyanate, tolylene-2,4- and tolylene-2,6-diisocyanate, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyldiphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-tri-isocyanatodiphenylether.

Modified polyisocyanates containing isocyanurate, carbodiimide or uretonimine groups may be used. Blocked polyisocyanates, such as the reaction product of a phenol or an oxime and a polyisocyanate, may be used, having a deblocking temperature below the temperature applied when using a polyisocyanate composition. We have, however found that using a composition according to the invention as a catalyst in the polyurethane reaction provides many benefits which have hitherto been achievable only by the use of such blocked polyisocyanates and so the use of these materials may not be required.

The organic polyisocyanate useful with the organometallic composition of the invention may also be an isocyanate-ended prepolymer made by reacting an excess of a diisocyanate or higher functionality polyisocyanate with a polyol for example a polyether polyol or a polyester polyol. The use of prepolymers is common in commercially available polyurethane systems. Prepolymer systems may not require addition of a separate polyol to form the polyurethane bond. Polyols may already be incorporated in the isocyanate or prepolymer whilst further components such as chain extenders, polyols etc may be mixed with the isocyanate mixture before polymerisation.

Mixtures of isocyanates may be used in conjunction with the organometallic composition of the invention, for example a mixture of toluene diisocyanate isomers such as the commercially available mixtures of 2,4- and 2,6-isomers. A mixture of di- and higher polyisocyanates, such as trimers (isocyanurates) or pre-polymers, may also be used. Polyisocyanate mixtures may optionally contain monofunctional isocyanates such as p-ethyl phenylisocyanate.

Such-mixtures are well-known in the art and include the crude phosgenation products containing methylene bridged polyphenyl polyisocyanates, including diisocyanate, triisocyanate and higher polyisocyanates together with any phosgenation by-products. Polymeric mixtures of methylene bridged polyphenyl polyisocyanates containing diisocyanate, triisocyanate and higher functionality polyisocyanates are often referred to as polymeric MDI.

Preferably the polyisocyanate is liquid at room temperature.

The isocyanate-reactive compound is preferably a polyol suitable for forming polyurethanes when reacted with an isocyanate compound in the presence of a catalyst of the invention including those polyols known to the skilled person for the manufacture of polyurethanes and like compounds. These include polymeric polyols such as polyether polyols, polyester polyols, polyolefin polyols, polycarbonate polyols and polymer modified polyols.

Polyether polyols which may be used include products obtained by the polymerization of a cyclic oxide, for example ethylene oxide, propylene oxide, butylene oxide or tetrahydrofuran in the presence, where necessary, of polyfunctional initiators. Polyether polyols having average hydroxy functionalities from 2 to 8, number average molecular weights within the range of about 400 to about 30,000, and hydroxyl numbers within the range of about 560 to about 5 mgKOH/g are preferred.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerization of tetrahydrofuran.

Polyester polyols which may be used include hydroxyl-terminated reaction products of polyhydric alcohols such ethylene glycol, propylene glycol, diethylene glycol, 1,4-butanediol, neopentyl glycol, 1,6-hexanediol, cyclohexane dimethanol, bis(hydroxyethyl)terephthalate, glycerol, trimethylolpropane, pentaerythritol or polyether polyols or mixtures of such polyhydric alcohols and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride, dimethyl terephthalate or mixtures thereof. Polyesteramides may be obtained by the inclusion of amino alcohols such as ethanolamine in polyesterification mixtures. Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde or by polymerizing cyclic acetals.

Suitable polyolefin polyols include hydroxy-terminated butadiene homo- and copolymers and suitable polysiloxane polyols include polydimethylsiloxane diols and triols.

Other polyols which may be used comprise dispersions or solutions of addition or condensation polymers in polyols of the types described above. Such modified polyols, often referred to as "polymer" polyols have been fully described in the prior art. Polyoxyalkylene polyols containing from 5 to 50% of dispersed polymer are particularly useful. Particle sizes of the dispersed polymer of less than 50 microns are preferred. Polyol-terminated prepolymers may also be used.

Other useful isocyanate-reactive polymers include polymeric polyamines, especially diamines and triamines, corresponding to the above-described polymeric polyols. Suitable polyamines of polyether polyols are those described, for example, in U.S. Pat. No. 3,654,374 or are obtained by the cyanoethylation of polyols followed by hydrogenation. Polyoxypropylene diamines and triamines and mixtures thereof are preferred. Also useful are polymers containing both amino and hydroxyl groups obtained by the partial amination of polyols. Further isocyanate-reactive polymers include imino-functional polymers, such as polymers described in U.S. Pat. No. 4,794,129 together with methods for their preparation and enamine functional polymers which may be prepared either from secondary amine terminated resins (i.e. polyethers) by reaction with ketones/aldehydes having one or more alpha hydrogens, or by reacting ketone/aldehyde terminated resins (bearing alpha hydrogens) with secondary amines, providing for removal of the water formed in the reactions.

A composition containing a catalyst composition of the present invention and a polyisocyanate and compounds reactive therewith may further comprise conventional additives such as chain modifiers, diluents, flame retardants, blowing agents, release agents, water, coupling agents, lignocellulosic preserving agents, fungicides, waxes, sizing agents, fillers, colourants, impact modifiers, surfactants, thixotropic agents, flame retardants, plasticisers, and other binders. The selection of these and other ingredients for inclusion in a formulation for a polyurethane composition is well known to the skilled person and may be selected for the particular purpose.

The catalysts of the present invention are useful for the manufacture of polyurethane foams, flexible or rigid articles, coatings, adhesives, elastomers, sealants, thermoplastic polyurethanes, and binders e.g. for oriented strand board manufacture. The catalysts of the present invention may also be useful in preparing polyurethane prepolymers, i.e. urethane polymers of relatively low molecular weight which are supplied to end-users for curing into polyurethane articles or compositions of higher molecular weight.

The catalysts are typically added to the isocyanate/alcohol mixture to give a concentration in the range $1 \times 10^{-4}$ to 10% by weight, preferably up to about 4% by weight based upon the weight of the isocyanate component.

Conventional release agents can be added to or used in combination with a polyisocyanate composition containing a catalyst composition according to the present invention. Examples of conventional release agents include polysiloxanes, saturated or unsaturated fatty acids (such as oleic acid) or fatty acid amides or fatty acid esters and polyolefin waxes. However we have found that a further advantage of the catalyst compositions of the present invention is that particularly when they are used in polyisocyanate resins for binding lignocellulosic materials for example, they function as exceptionally good internal release agents, so that a greatly reduced amount of a conventional release agent is required. The reduction or elimination of the requirement for a release agent allows the process steps in making the polyurethane articles to be reduced with the consequent savings in process time and improvement in process safety. Also external release agents are normally provided in a solvent so less solvent vapour is given off in the manufacturing process.

The organometallic composition of present invention can be used in a process for preparing lignocellulosic bodies by binding a lignocellulosic material with a polyisocyanate composition to form a polyurethane material by reaction with the hydroxy groups of the lignocellulosic material.

The methods used are well-known methods used in the art and are described in WO-A-97117388 and other publications. More detailed descriptions of methods of manufacturing wafer-board and similar products based on lignocellulosic material are available in the prior art.

The organometallic compositions of the invention are also useful in many applications in which it is desired to effect curing of isocyanate groups in a polyurethane. Such applications include coatings, e.g. decorative and industrial coatings for protection of wood, metals, plastics, glass, ceramics and other surfaces, including coatings subjected to heat. Still further applications may be found in composites, adhesives, elastomers, foams and thermoplastic polyurethanes for use in automotive applications or footwear for example. The applications mentioned herein are intended only as examples since the practical applications depend upon the type of polyurethane which is intended to be made.

The invention is illustrated but not limited by the following examples.

EXAMPLE 1

A composition according to the invention was made by mixing together tetra(n-butoxy) titanate (TNBT) with methyl ethyl ketone (MEK) in a mole ratio of 1:2.5.

The composition was used as a catalyst in an isocyanate composition used for the manufacture of oriented strand board (OSB). The composition was added to the isocyanate resin at a rate of 3.5 wt % based on resin. The resin was used at a rate of 2.5 wt % based on wood. A 3-layer composite waferboard was manufactured on a test facility following normal methods used in the industry. The resin/wood composition was of the same composition for all layers but the water content of the core layer was 4% and that of the face layers was 8%.

A soap-wax release agent was used on the face of the plates used to form the board. In conventional manufacture, it is necessary to re-apply this type of release agent each time a board is made. In the example here, the release agent was applied only once at 25% of the recommended coverage and was not reapplied between subsequent boards. The release of the boards from the plates was monitored and the experiment was concluded when a board required significant physical force to release it from the plate.

The control boards were made without using any using a catalyst Using the resin composition of the invention, the experiment was stopped after 12 boards were made without any sticking to the plates. When no catalyst composition was used, the third board stuck to the plates and the fourth was very difficult to remove so the experiment was stopped. This shows that the composition of the invention enables boards to be made which release easily from the moulding plates even when no external release agent is used.

The mechanical properties of the boards and of the control board (first from batch) is shown in the table. Example 1a, 1b and 1c are the first, $6^{th}$ and twelfth boards respectively of the consecutive batch.

TABLE 1

| | Control | Example 1a | Example 1b | Example 1c |
|---|---|---|---|---|
| Modulus of Rupture (Mpa) | 32.1 | 28.9 | 25.0 | 20.7 |
| Modulus of Elasticity (Mpa) | 5700 | 5300 | 4800 | 4500 |
| Internal bond (Mpa) | 0.387 | 0.282 | 0.160 | 0.080 |
| Thickness swell 24 h (%) | 7.0 | 10.9 | 12.6 | 15.6 |
| Water absorption 24 h (%) | 19.6 | 21.7 | 22.6 | 28.9 |

EXAMPLE 2

A catalyst composition according to the invention was made by mixing together tetra(isopropoxy) titanate (TIPT) with MEK in a mole ratio of 1:2.5.

The viscosity of a polyisocyanate composition containing the catalyst composition (0.2% by weight) was tested by means of a Brookfield DV-II Programmable Viscometer (following the Operating instructions found in the Brookfield Operating Instructions Manual No M/97-164-B299) at various intervals over a period of time during which the temperature was increased from 80° C. to 120° C. The results are shown in the graphs shown in FIG. 1. The results show that the composition is stable at 80° C. but when the temperature is increased to 120° C. polymerisation of the isocyanate composition proceeds very rapidly leading to a rapid increase in viscosity. The control sample contained no catalyst.

EXAMPLE 3

A series of catalyst compositions according to the invention was made by mixing together a titanium compound with a coordinating compound as identified in the Table 2. The mixing was done at room temperature (about 22° C.) under nitrogen for approximately 30 minutes (or until a homogeneous mixture was obtained).

The catalyst compositions were mixed under an inert atmosphere with a commercial polyurethane prepolymer system sold under the DESMODUR tradename by Bayer. The viscosity of each mixture was measured as described in Example 2 at various temperatures. The results are shown in Table 3. The comparative compositions shown contained no coordinating compound.

TABLE 2

| Catalyst | Metal component | Coordinating component | M:C (molar) |
|---|---|---|---|
| A (comparison) | TIPT | — | — |
| B | TIPT | MEK | 1:2.5 |
| C (comparison) | 2-Ethyl hexyl titanate | — | — |
| D | 2-Ethyl hexyl titanate | MEK | 1:2.5 |
| E (comparison) | Ethyl titanate | — | — |
| F | Ethyl titanate | MEK | 1:2.5 |

EXAMPLE 4

Catalyst G was made by reacting together TIPT+ethyl acetoacetate at room temperature under nitrogen in the ratio 1 mole:2 mole and removing by distillation 2 moles of isopropanol formed in the reaction. To the resulting orange semi-solid titanium complex, MEK is added and mixed under nitrogen at a ratio of 1 mol Ti:2.5 moles MEK to obtain a homogeneous orange liquid.

Catalyst H was made by mixing together under nitrogen TIPT with 2-dodecanone in the ratio 1 mole Ti:2.5 moles dodecanone.

Catalyst compositions G and H were used to cure a two-part commercial polyurethane system comprising an isocyanate prepolymer and a polyether polyol with a chain extender and other additives. The polyurethane system was used according to the manufacturer's instructions and the catalyst was added to the polyol component. The compositions were allowed to cure at 25° C. and the viscosity was measured at various times as before. A mercury catalyst (phenyl mercuric neodecanoate) was used as a comparison at an amount giving about 0.2 wt % of the Hg compound based on isocyanate.

The results are shown in Tables 4 & 5. The results show that at a concentration of $4.7 \times 10^{-3}$ wt % of catalyst G and 0.084 wt % of catalyst H, the cure time was similar to that provided by the mercury catalyst but that the viscosity profile is different in that the cream time of the composition containing the catalysts of the invention is longer, allowing for greater flexibility in handling the polyurethane system, e.g. by manipulating the composition in the mould to give a good surface coverage etc. The catalysts of the invention provide a very rapid cure once the cure reaction begins. The environmental benefits of replacing a mercury catalyst are also to be noted.

EXAMPLE 5

The shelf life of the compositions containing catalyst according to the invention was tested by adding 0.285 wt % a catalyst comprising catalyst B as a 25% solution in toluene to a polyol component (22g) of a commercial polyurethane system. The polyol was stored at 25° C. and 45° C. for several days and samples were tested at various times by mixing with the polyisocyanate (10 g) of the polyurethane system and curing according to the manufacturer's instructions. The time for the mixed composition to achieve a viscosity (measured as before) of 40,000 cP is shown in Table 6.

TABLE 6

| Days | Storage T (° C.) | Reaction T (° C.) | time (min.) to reach 40000 cP @ 25° C. |
|---|---|---|---|
| 1 | 25 | 25 | 9 |
|  | 45 | 25 | 8 |
| 7 | 25 | 25 | 7.5 |
|  | 45 | 25 | 8 |
| 14 | 25 | 25 | 7 |
|  | 45 | 25 | 10 |
| 21 | 25 | 25 | 9.5 |
|  | 45 | 25 | 12 |
| 28 | 25 | 25 | 9 |

TABLE 4

| | Catalyst G | | | | | |
|---|---|---|---|---|---|---|
| Time (mins) | 0.014 wt % Viscosity (cP) | 0.0077 wt % Viscosity (cP) | 0.0065 wt % Viscosity (cP) | 0.0047 wt % Viscosity (cP) | 0.0026 wt % Viscosity (cP) | Hg 0.216 wt % Viscosity (cP) |
| 0 |  |  |  | 1520 |  | 1440 |
| 1 | 2000 | 1640 | 1800 | 1640 | 1800 | 1480 |
| 2 | 2480 | 1840 | 1960 | 1720 | 1880 | 1600 |
| 3 | 3880 | 2160 | 2120 | 1840 | 1960 | 1800 |
| 4 | 13080 | 2800 | 2440 | 1960 | 2040 | 2080 |
| 5 | 40000 | 4480 | 2840 | 2160 | 2120 | 2480 |
| 6 |  | 11200 | 3440 | 2440 | 2240 | 3040 |
| 7 |  | 40000 | 4560 | 2840 | 2400 | 3880 |
| 8 |  |  | 6800 | 3480 | 2520 | 5200 |

TABLE 4-continued

| | Catalyst G | | | | | Hg |
|---|---|---|---|---|---|---|
| Time (mins) | 0.014 wt % Viscosity (cP) | 0.0077 wt % Viscosity (cP) | 0.0065 wt % Viscosity (cP) | 0.0047 wt % Viscosity (cP) | 0.0026 wt % Viscosity (cP) | 0.216 wt % Viscosity (cP) |
| 9 | | | 12200 | 4480 | 2760 | 7200 |
| 10 | | | 27040 | 6360 | 2960 | 10200 |
| 11 | | | 40000 | 10200 | 3240 | 14960 |
| 12 | | | | 19440 | 3600 | 22520 |
| 13 | | | | 40000 | 3960 | 34880 |

TABLE 5

| | Catalyst H | | | | Hg |
|---|---|---|---|---|---|
| Time (mins) | 0.193 wt % Viscosity (cP) | 0.084 wt % Viscosity (cP) | 0.045 wt % Viscosity (cP) | 0.017 wt % Viscosity (cP) | 0.216 wt % Viscosity (cP) |
| 0 | 1540 | 1440 | 1540 | 1580 | 1440 |
| 1 | 1840 | 1520 | 1600 | 1720 | 1480 |
| 2 | 2320 | 1600 | 1680 | 1760 | 1600 |
| 3 | 4120 | 1680 | 1720 | 1800 | 1800 |
| 4 | 32480 | 1760 | 1760 | 1840 | 2080 |
| 5 | 40000 | 1880 | 1880 | 1880 | 2480 |
| 6 | | 2040 | 1960 | 2000 | 3040 |
| 7 | | 2280 | 2120 | 2080 | 3880 |
| 8 | | 2640 | 2240 | 2200 | 5200 |
| 9 | | 3200 | 2480 | 2320 | 7200 |
| 10 | | 4120 | 2720 | 2480 | 10200 |
| 11 | | 6080 | 3080 | 2640 | 14960 |
| 12 | | 11560 | 3560 | 2840 | 22520 |
| 13 | | 40000 | 4280 | 3080 | 34880 |

TABLE 3

| Prepolymer system | catalyst | conc % | 30° C. visc at 10 min | 30° C. visc at 30 min | 50° C. visc at 10 min | 50° C. visc at 30 min | 80° C. visc at 10 min | 80° C. visc at 30 min | 100° C. visc at 10 min | 100° C. visc at 30 min | 120° C. visc at 10 min | 120° C. visc at 30 min | time to reach 55,000 cP |
|---|---|---|---|---|---|---|---|---|---|---|---|---|---|
| Desmodur™ E744 | A (comp) | 3 | | | | | 1100 | 1750 | 8450 | 38100 | | | 35 min @ 100° C. |
| | B | 3 | 1300 | 2900 | 1250 | 1550 | 400 | 650 | 2650 | 17450 | | | 50 min @ 100° C. |
| Desmodur E743 | C (comp) | 2 | | | | | 700 | 5900 | | | | | 45 min @ 80° C. |
| | C (comp) | 3 | | | | | 1500 | *55000 | | | | | 25 min @ 80° C. |
| | D | 3 | 2250 | 2450 | 850 | 850 | 300 | 350 | 550 | 1250 | 1800 | 7500 | 40 min @ 120° C. |
| Desmodur E28 | E (comp) | 3 | | | | | | | | | | | 1 min @ 25° C. |
| | E(comp) | 2 | | | | | | | | | | | 1 min @ 25° C. |
| | F | 3 | | | 2500 | 3750 | 3850 | >55,000 | | | | | 15 min @ 80° C. |

The invention claimed is:

1. A catalyst composition suitable for use to catalyse the reaction of an isocyanate compound or prepolymer thereof with an alcohol, polyol or prepolymer thereof to form a polyurethane, said catalyst composition comprising a mixture made by mixing together
(a) an organometallic compound selected from
(i) an alkoxide compound of formula $M(OR)_x$, wherein M is a metal selected from the group consisting of titanium, zirconium, hafnium, aluminum, cobalt, iron, and mixtures thereof, wherein x is the valency of the metal, and wherein OR is the residue of an alcohol ROH in which R comprises an (optionally substituted) $C_{1-30}$ cyclic, branched or linear, alkyl, alkenyl, aryl or alkyl-aryl group or a mixture thereof, or
(ii) a complex of titanium, zirconium and/or hafnium and an acetoacetate ester and
(b) a coordinating compound selected from the group consisting of ketones and aldehydes, wherein said coordinating compound does not comprise a diketone or an acetoacetate ester, and wherein the molar ratio of organometallic compound to coordinating compound is in the range 1:0.5 to 1:10.

2. A catalyst composition according to claim 1 wherein the metal is titanium or zirconium.

3. A catalyst composition according to claim 1 wherein said coordinating compound is a ketone.

4. A catalyst composition according to claim 1, wherein the metal is titanium and the molar ratio is in the range 1:0.5 to 1:4.

5. A curable composition for the manufacture of a polyurethane material, said composition comprising:
A) a polyol component,
B) a polyisocyanate component, and
C) a catalyst composition comprising a mixture of:
  (a) an organometallic compound selected from
    (i) an alkoxide compound of formula $M(OR)_x$ wherein M is a metal selected from the group consisting of titanium, zirconium, hafnium, aluminum, cobalt, iron, and mixtures thereof, wherein x is the valency of the metal, and wherein OR is the residue of an alcohol ROH in which R comprises an (optionally substituted) $C_{1-30}$ cyclic, branched or linear, alkyl, alkenyl, aryl or alky-aryl group or a mixture thereof, or
    (ii) a complex of titanium, zirconium and/or hafnium and an acetoacetate ester and
  (b) a coordinating compound selected from the group consisting of ketones, aldehydes, carboxylic acids, sulphonic acids, nitriles and imines, wherein said coordinating compound does not comprise a diketone or an acetoacetate ester.

6. A curable composition according to claim 5 wherein the catalyst is added to either the polyol component or the isocyanate component.

7. A process for the manufacture of a polyurethane composition, comprising the step of mixing together a polyol component and a polyisocyanate component and a catalyst composition, said catalyst composition comprising a mixture of:
  (a) an organometallic compound selected from
    (i) an alkoxide compound of formula $M(OR)_x$, wherein M is a metal selected from the group consisting of titanium, zirconium, hafnium, aluminum, cobalt, iron, and mixtures thereof, wherein x is the valency of the metal, and wherein OR is the residue of an alcohol ROH in which R comprises an (optionally substituted) $C_{1-30}$ cyclic, branched or linear, alkyl, alkenyl, aryl or alkyl-aryl group or a mixture thereof, or
    (ii) a complex of titanium, zirconium and/or hafnium and an acetoacetate ester and
  (b) a coordinating compound selected from the group consisting of ketones, aldehydes, carboxylic acids, sulphonic acids, nitriles and imines, wherein said coordinating compound does not comprise a diketone or an acetoacetate ester.

8. A process according to claim 7 wherein the catalyst composition is mixed together with one of the polyol or the polyisocyanate components before the polyol and polyisocyanate components are mixed together.

9. A process according to claim 7, wherein the catalyst component is added to a mixture of the polyol and polyisocyanate components.

10. A process according to claim 7 further comprising the step of heating the mixture of polyol component and polyisocyanate component.

11. A formulation comprising a polyol and a catalyst composition, said catalyst composition comprising a mixture of
  (a) an organometallic compound selected from
    (i) an alkoxide compound of formula $M(OR)_x$, wherein M is a metal selected from the group consisting of titanium, zirconium, hafnium, aluminum, cobalt, iron, and mixtures thereof, wherein x is the valency of the metal, and wherein OR is the residue of an alcohol ROH in which R comprises an (optionally substituted) $C_{1-30}$ cyclic, branched or linear, alkyl, alkenyl, aryl or alkyl-aryl group or a mixture thereof, or
    (ii) a complex of titanium, zirconium and/or hafnium and an acetoacetate ester and
  (b) a coordinating compound selected from the group consisting of ketones, aldehydes, carboxylic acids, sulphonic acids, nitriles, and imines, wherein said coordinating compound does not comprise a diketone or an acetoacetate ester.

12. A formulation comprising a polyisocyanate and a catalyst composition, said catalyst composition comprising a mixture of
  (a) an organometallic compound selected from
    (i) an alkoxide compound of formula $M(OR)_x$, wherein M is a metal selected from the group consisting of titanium, zirconium, hafnium, aluminum, cobalt, iron, and mixtures thereof, wherein x is the valency of the metal, and wherein OR is the residue of an alcohol ROH in which R comprises an (optionally substituted) $C_{1-30}$ cyclic, branched or linear, alkyl, alkenyl, aryl or alkyl-aryl group or a mixture thereof, or
    (ii) a complex of titanium, zirconium and/or hafnium and an acetoacetate ester and
  (b) a coordinating compound selected from the group consisting of ketones, aldehydes, carboxylic acids, sulphonic acids, nitrites, and imines, wherein said coordinating compound does not comprise a diketone or an acetoacetate ester.

13. A catalyst composition according to claim 1, wherein the metal is hafnium or zirconium and the molar ratio is in the range of 1:4 to 1:10.

14. A curable composition according to claim 5, wherein the coordinating compound is a ketone.

15. A curable composition according to claim 5, wherein the molar ratio of organometallic compound to coordinating compound is in the range of 1:0.5 to 1:10.

16. A curable composition according to claim 15, wherein the metal is titanium and the molar ratio is in the range of 1:0.5 to 1:4.

17. A curable composition according to claim 15, wherein the metal is hafnium or zirconium and the molar ratio is in the range of 1:4 to 1:10.

18. A process according to claim 7, wherein the coordinating compound is a ketone.

19. A process according to claim 7, wherein the molar ratio of organometallic compound to coordinating compound is in the range of 1:0.5 to 1:10.

20. A process according to claim 19, wherein the metal is titanium and the molar ratio is in the range of 1:0.5 to 1:4.

21. A process according to claim 19, wherein the metal is hafnium or zirconium and the molar ratio is in the range of 1:4 to 1:10.

22. A formulation according to claim 12, wherein the molar ratio of organometallic compound to coordinating compound is in the range of 1: 0.5 to 1:10.

* * * * *